United States Patent
Wenrich et al.

[15] 3,696,227
[45] Oct. 3, 1972

[54] STUD WELDING GUN METHOD

[72] Inventors: Carl M. Wenrich, Reading; Bernard W. Downs, Elverson, both of Pa.

[73] Assignee: Weld-Record Corporation, Reading, Pa.

[22] Filed: Sept. 21, 1970

[21] Appl. No.: 74,101

Related U.S. Application Data

[60] Continuation of Ser. No. 820,797, May 1, 1969, which is a division of Ser. No. 424,743, Jan. 11, 1965, Pat. No. 3,456,090.

[52] U.S. Cl.................................219/99, 219/98
[51] Int. Cl. ..........................................B23k 9/20
[58] Field of Search...........219/98, 99, 100, 105, 107

[56] References Cited

UNITED STATES PATENTS 3,340,379  9/1967  Sweeney....................219/99
2,942,096  6/1960  Jones.........................219/98
2,763,755  9/1956  Graham......................219/98

Primary Examiner—R. F. Staubly
Attorney—William J. Ruano

[57] ABSTRACT

A method for operating a stud welding gun having a reciprocable stud supporting chuck mounted on an actuating shaft, which method involves forcibly accelerating the shaft forwardly by electro-magnetic means to strike the work and penetrate any surface coating thereon to make metallic contact before applying welding current through the chuck and stud, and after a short time period, applying full welding current while retracting the stud from the work to draw an arc, and thereafter interrupting the welding current and moving the stud into the molten metal to form a "soft plunge" and weld.

3 Claims, No Drawings

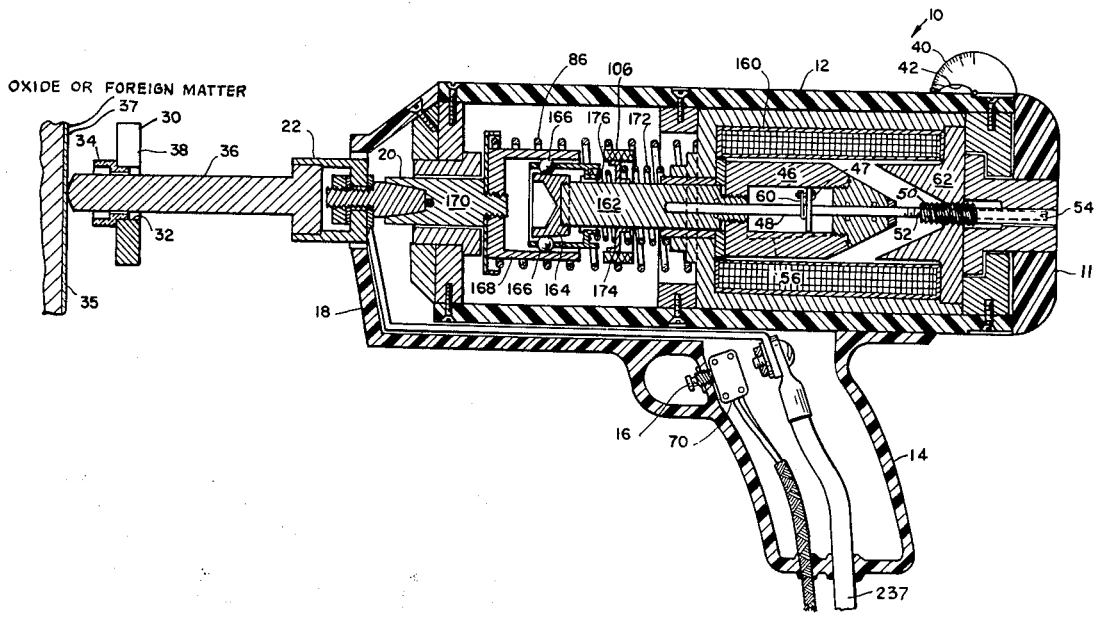

PATENTED OCT 3 1972

INVENTORS
CARL M. WENRICH and
BERNARD W. DOWNS
BY William J. Ruano
their ATTORNEY INVENTORS
CARL M. WENRICH and
BERNARD W. DOWNS
BY
their ATTORNEY INVENTORS
CARL M. WENRICH and
BERNARD W. DOWNS
BY
William J. Ruano
their ATTORNEY INVENTORS
CARL M. WENRICH and
BERNARD W. DOWNS
BY
William J. Ruano
their ATTORNEY

STUD WELDING GUN METHOD

This invention relates to a stud welding gun method and control system therefor and is a continuation of our patent application Ser. No. 820,797, filed May 1, 1969, which was a division of our patent application Ser. No. 424,743 filed Jan. 11, 1965, now U.S. Pat. No. 3,456,090, issued July 15, 1969.

An outstanding disadvantage of stud welding guns of well known construction is that often times it is difficult or even impossible to strike an arc upon application of the gun to the work.

Another disadvantage is that such guns are relatively of large size, heavy, cumbersome and complicated in construction, as well as expensive to manufacture.

Still another disadvantage is that voltage variations and ambient temperature variations adversely affect the control of the weld-cycle time.

An object of our invention is to provide a novel stud welding gun and circuit that will obviate the abovementioned difficulties and that will always assure firing immediately upon application of weld current to the stud.

A more specific object of the present invention is to provide a highly improved stud welding gun which is of a size not much greater than that of an ordinary 45 caliber pistol.

Another object is to provide a constant voltage timing circuit which allows more precise control of the weld-cycle time so as to allow more reproducible results irrespective of wide variations in ambient temperature.

Still another object is to provide a novel method of striking an arc by a stud welding gun.

Other objects and advantages will become more apparent from a study of the following description taken with the accompanying drawings wherein.

Figures 1, 2:
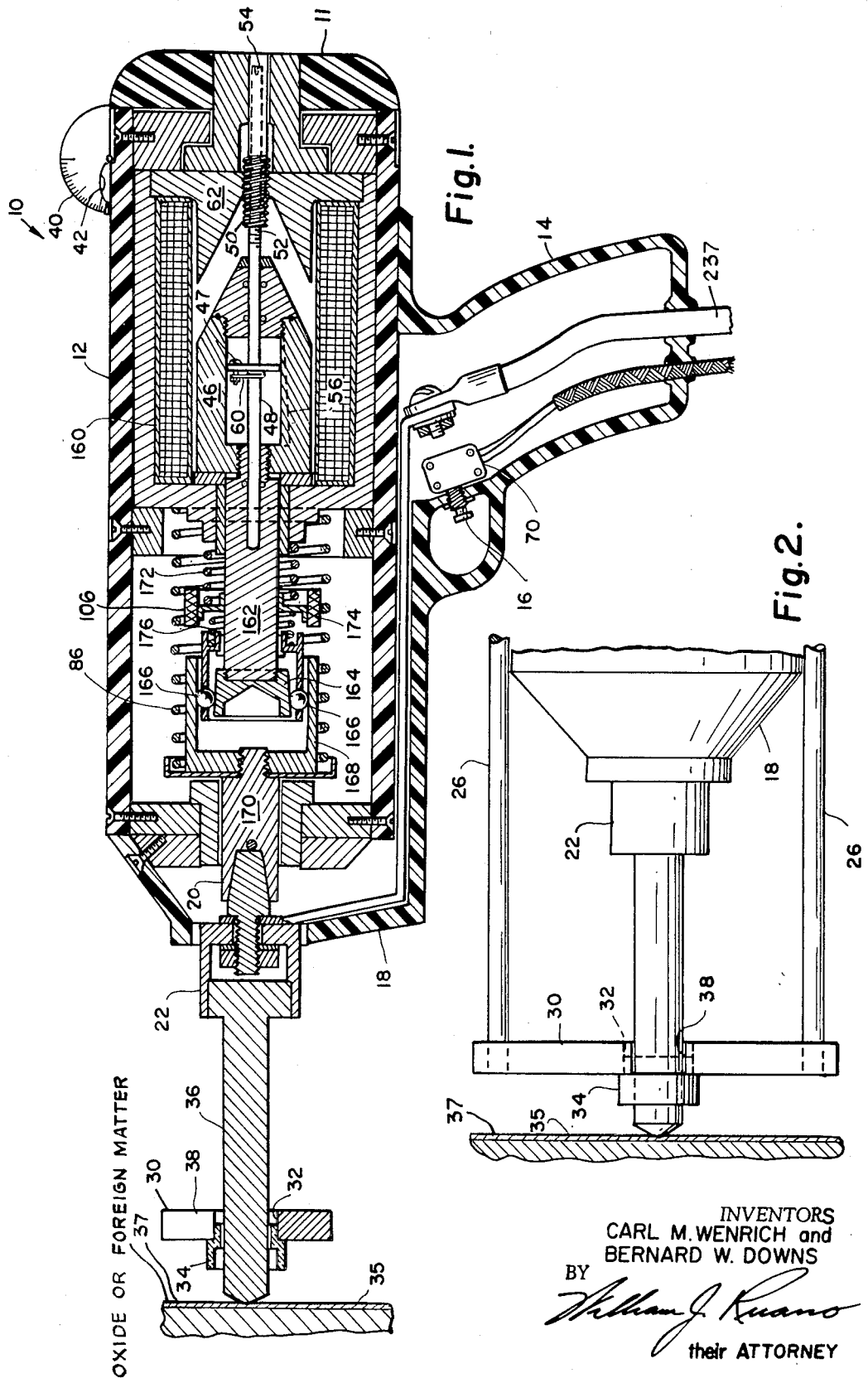
FIG. 1 is a longitudinal, cross-sectional view of a stud welding gun embodying the principles of the present invention.
FIG. 2 is an enlarged, fragmentary top view of the front portion of the gun shown in FIG. 1.
Figures 3, 4:
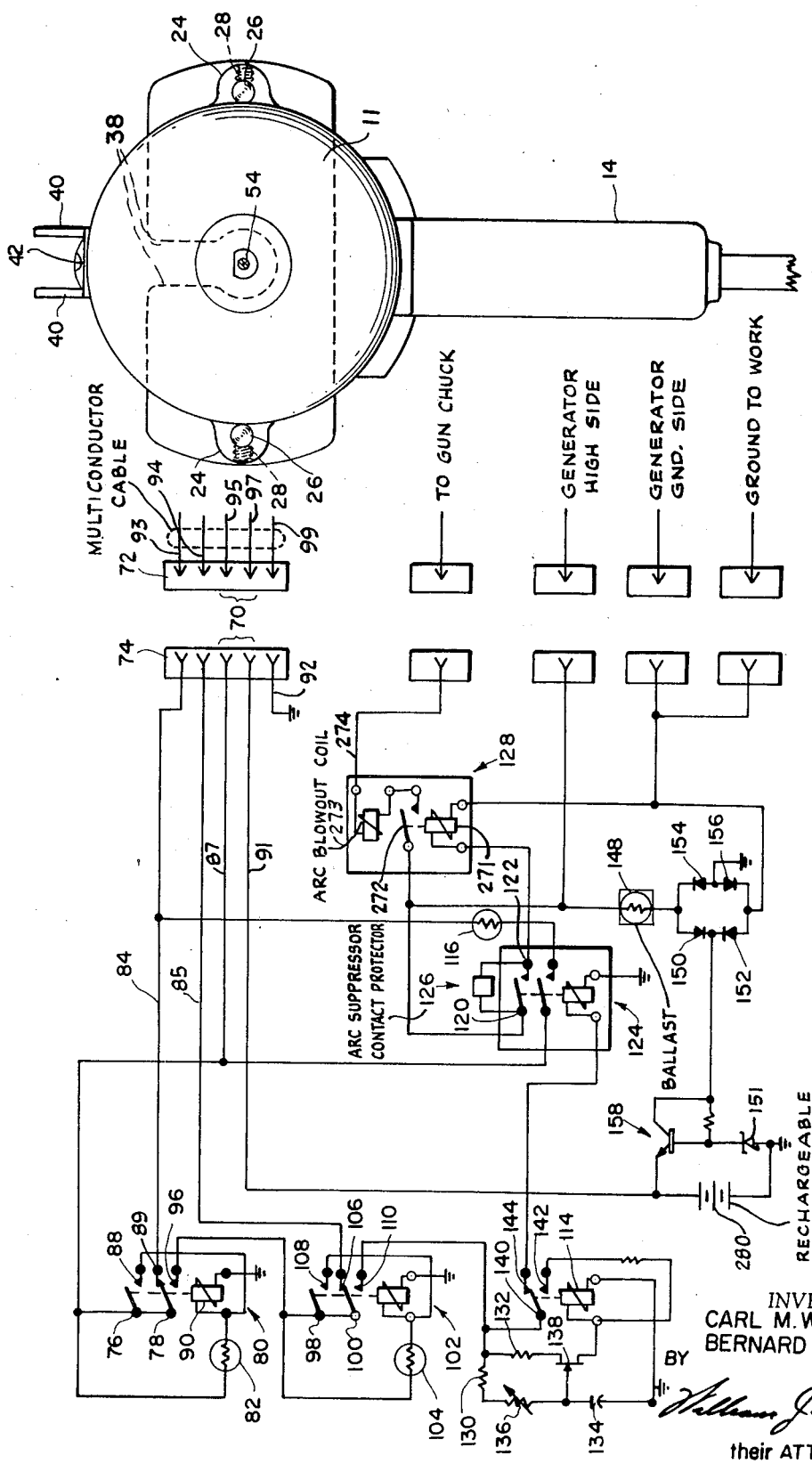
FIG. 3 is an end view as viewed from the right of FIG. 1.
FIG. 4 is a schematic diagram of a control circuit for the gun shown in FIGS. 1, 2 and 3.

Referring more particularly to FIGS. 1, 2 and 3 of the drawing, the gun, generally denoted by numeral 10, is a tool that will automatically electric arc weld a stud or bar 36 of metal to another piece of metal, with reproducible accuracy with respect to time, weld energy and angular position.

The gun 10 is approximately cylindrical in shape, with a comfortable pistol grip handle 14. It has a trigger 16 and trigger guard, located and sized so that an operator's index finger can operate while wearing gloves. The body 12 and handle 14 of the gun are of an insulating material, so as to prevent electric shock hazard. The back end of the gun is a knob 11, which, by turning, adjusts the amount of stud lift. The front end 18 of the gun is conical in shape, to allow easier viewing of the stud 36 and work area 35 while setting up and welding.

There is a taper chuck 20 on the front end of the gun which will accept a variety of friction chucks 22. These friction chucks are so sized as to accept the various studs or bars to be welded.

There are sockets 24 located on the outside of the gun body, into which support rods 26 will fit. There are, recessed into the sides of these sockets, lock screws 28, which, when tightened, will prevent movement of the support rods.

At the front end of the support rods, there is a bridging device 30, made of an insulating material, which serves to securely fasten the support rods together, also, to form a socket 32 for a ceramic cup 34.

The ceramic cup 34 is a commercial item used to provide a bearing for the movement of the stud 36 and a mold which forms the molten metal into a uniform fillet around the stud as it is pushed into the pool of molten metal during the final stages of the welding cycle.

The socket 32, which holds the ceramic cup 34, is so formed that when the stud is welded to the work, the gun may be removed from the stud 36 by moving the bridge 30 to the side through slot 38. A slot 38 is provided in the bridge 30, which is slightly larger than the diameter of the stud body.

The distance of the bridge 30 from the front end of the gun is determined by the length of the stud or bar to be welded. The adjustment of this bridge is accomplished by sliding the support rods 26 in the sockets 24 (FIG. 3) of the gun body. When the proper adjustment has been determined, the rods are locked by means of the recessed lock screws 26.

There is mounted on the gun an adjustable bubble level sight 42 for aiming the gun toward the work 35 at a preset angle determined by protractor 40, whereby any variation from that angle can be detected and displayed.

The gun, illustrated in FIGS. 1, 2 and 3, with the control circuit in FIG. 4, has a mechanism for the purpose of producing an accurate, adjustable and reproducible lift of the stud from the work before welding current is applied to the bar or stud. The welding current is conducted to the stud by means of a contactor which is energized immediately after lifting occurs. The stud or bar is then quickly returned to the work, with a sharp impact, so as to break existing oxide or foreign matter 37 from the surface of the work, enabling the positive striking of the arc. The same mechanism again quickly lifts the stud to an accurate and reproducible level, determined by stop 50 and knob 11 assembly on FIG. 1, simultaneously drawing an arc, the heat of which produces a pool of metal into which the stud is returned after the proper time interval, determined by the timing circuit is a controlled manner (FIG. 4), so as not to splash the molten pool of metal produced by the arc hereinafter known as "soft plunge."

The "soft plunge" i.e., rate of return, is adjustable and accurately reproducible, as follows:

Plunger 46 is bored out to form a cylinder, in which a piston 47 if forced to travel, since piston rod 48 is fixed within stop 50 by threads 52 on the outside of rod 48 and inside stop 50. There is a screwdriver adjustment slot 54 on the end of rod 48 so that the position of the piston within the cylinder can be adjusted from the back of the gun. There is a tapered slot 56 in the cylinder, connecting the front of the piston to the back of the piston. In the piston 47, there is a one way poppet valve 60, which allows fluid to flow from the front of the piston to the back of the piston, but prevents flow in the opposite direction.

When the plunger moves toward the pole piece 62, piston 58 forces oil through the poppet valve 60, thereby allowing the plunger 46 to move back easily. When the plunger moves away from the pole piece, the valve 60 closes and the oil must then flow through the slot, or orifice 56 in the cylinder.

The slot is tapered along its entire length, so the rate of flow of oil is determined by the position occupied by the piston 47. The position is adjustable by the screwdriver slot 54 in rod 48. Thus an adjustable "soft plunge" is assured.

When the trigger switch 16 is depressed, current flows in the stud lift solenoid coil 160 producing a magnetic flux which then appears between plunger 46 and pole piece 62 tending to draw the plunger against the pole piece. The plunger moves toward the pole piece, drawing rod 162 with it. Rod 162 moves taper cone 164 forcing balls 166 against clutch cup 168 thereby locking the clutch cup 168 to the rod 162. The clutch cup is fastened to bar 170, an extension of the taper chuck 20, which accepts the friction chucks 22, sized to fit various studs or bar sizes.

When bar 170 moves, the stud 36 moves with it, drawing the stud away from the work. When the plunger 46 is drawn toward the pole piece, the train of parts just described compresses spring 86 and spring 172. Spring 86 tends to drive the stud back toward the work 35, when the solenoid 160 is de-energized, but the piston 47 and rod assembly, located inside the plunger 46, slows the return of plunger 46 to its original position. The space surrounding the piston is filled with a silicone oil, of a suitable viscosity. There is a poppet valve 60, spring loaded so that when the solenoid 160 is energized the valve is opened by flow of oil, and allows free movement of the piston inside of plunger 46. However, when the plunger 46 is returning to its forward position, after current is removed from solenoid 160 the poppet valve 60 closes forcing the oil to pass through a small orifice 56. This retards the forward movement of the plunger, permitting the stud to enter the molten pool gently, as in a "soft plunge," while offering minimal resistance to its movement toward the rear of the gun. However, when clutch release solenoid 174 is energized, the clutch cup 168 and stud 36 are allowed to go forward rapidly under the pressure of spring 86 but the plunger 46, rod 162 and cone 164 still return to their original position slowly. Spring 172 forces the plunger and rod 162 to be always in the most forward position until the solenoid 160 is energized.

Spring 176 forces balls 166 into constant contact with clutch cup 168 and taper cone 164. When separate clutch release solenoid 174 is energized, it compresses spring 176 and allows clutch cup 168 to be free of the balls 166 and cone 164. When this happens, spring 86 will push the stud 36 toward the work 35 with no restraint. This method provides a sharp impact, necessary to break through any existing oxide or other foreign matter 37 on the work.

By depressing the trigger switch 16, the timing mechanism in the controller FIG. 4 initiates the current flow to clutch release solenoid 174 at the proper time.

DESCRIPTION OF STUD WELDER CONTROLS FOR GUN IN FIGS. 1, 2 AND 3

FIG. 4 shows a control system to control the welding time of a metal stud, of any given size, in such a manner as to produce a sound, dense weld with ample fillet between the stud and the work, or parent metal.

The control box and system are designed for complete field and shop portability. That is, the control box and gun can be used at extended distances from the power source.

When the trigger switch 16 on the gun 10 is depressed, the conductors 70 in the gun cable connect the positive pole of the rechargeable battery 280 to arms 76 and 78 of relay 80, also connect the positive pole of the battery 280 through thermistor 82 to the coil 90 of relay 80. Arm 78 of relay 80 initially contacts the normally closed contact of relay 80, which conducts current through wire 84, thereby connecting the battery 280 to the stud lift solenoid 160, FIG. 1 through the gun cable 72. This causes the solenoid 160 to lift the stud from the work, thereby compressing spring 86 in the gun. The current in thermistor 82 causes same to heat, thereby reducing its resistance until resistance is low enough to close the relay contacts 88 and 96 which are normally open. The time necessary for thermistor 82 to heat sufficiently to close relay 80 is sufficient to allow the stud lift solenoid 160 to lift the stud 36 from the work 35 to the end of its predetermined travel before arm 38 is disconnected from the normally closed contact when coil 80 is energized. When relay 80 closes, contact 88 connects the battery 280 to the coil 90 locking the relay 80 in the energized position. Contact 96 connects the battery 280 to arms 98 and 100 of relay 102 and to thermistor 104. Contact 106 of relay 102 connects the battery 280 to the clutch release coil 106 through the gun cable 72. This causes the clutch to be released, allowing spring 86 in the gun to rapidly return the stud to the work in a tapping or striking manner, as in a center-punching action breaking through any existing scale or oxide 37 or other insulating surface contamination. This produces a positive contact between the stud 36 and the work 35, or parent metal.

After relay 80 closed, heat caused by current through thermistor 104 lowers its resistance until relay 102 closed, when arms 98 and 100 are connected to 108 and 110 respectively, 108 locks the relay 102 in the energized position and 110 connects the battery 280 to the arm 140 of relay 114 and contact 144. Relay 124 then closes, connecting the battery 280 through arm 100 and contact 110, arm 140 and contact 144 through thermistor 116 to the stud lift solenoid 160 in the gun 10. Arm 120 and contact 122 connect the welding power source, usually a motor generator set, to the coil 271 of the contactor 122, relay 128 which conducts weld current to the gun through the weld current cable 237, and thence through chuck 22 to stud 36. When thermistor 116 builds up enough heat, its resistance lowers enough so that the stud lift solenoid 160 lifts the stud 36, thereby producing an arc between stud 36 and work, or parent metal 35. Said arc causes the end of stud 36 to melt and also area of work or parent metal 35 beneath stud 36. This produces a resulting pool or puddle of molten metal.

When the contact 110 of relay 102 was closed, the battery 280 was connected to 132 and 130. Resistor 130 allowed current to flow into capacitor 134 slowly charging same, at a rate determined by rheostat 136. When capacitor 134 reaches the proper potential, transistor 138 conducts, energizing relay 114, connecting arm 140 to contact 142, which locks the relay in the closed position. Transistor 138, resistors 130, 132, rheostat 136, capacitor 134 and relay 114 all comprise the "Weld Cycle Timer," which determines exactly how long welding current is applied to the stud. It must be variable because there are many sizes of studs.

As relay 114 closes, arm 140 disconnects the battery 280 from contact 144 releasing relay 124 which releases the contactor relay 128, disconnecting the power source or generator from the stud welding gun 10. At the same time, relay 124 releases the stud lift solenoid 160, which allows the stud 36 to return to the work 35. The stud enters the puddle in a controlled manner due to the action of the piston 48 and cylinder in the plunger 46 as explained in the description of the stud welding gun. A sound fusion weld between the stud 36 and the work 35, or parent metal is thus produced.

Ballast tube 148 is a device which offers a resistance proportional to the current flow through it, and this serves to regulate the voltage appearing across the bridge rectifier formed by 150, 152, 154, and 156, respectively. This rectifier serves as an automatic current reversing switch, so that the output of the bridge always has the same polarity, independent of the input polarity.

The junction of 150 and 152 is connected to voltage regulator 158 which serves to supply the correct charging voltage for the battery 280. This circuitry is necessary to assure accurate and reproducible timing in the electronic and relay circuits.

Figure 5:
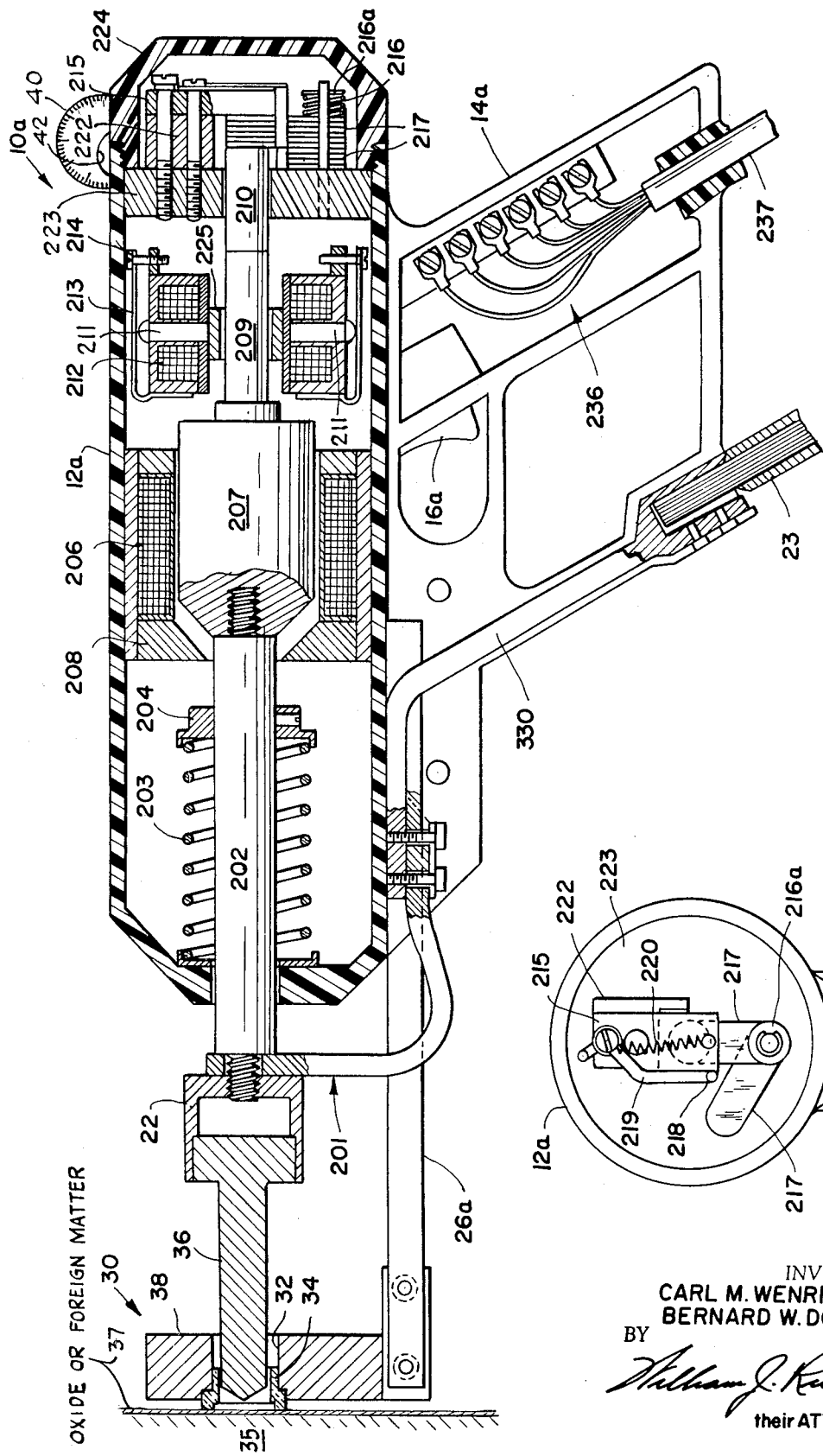
FIG. 5 is a longitudinal, cross-sectional view of a modification of the stud welding gun.
Figure 6:
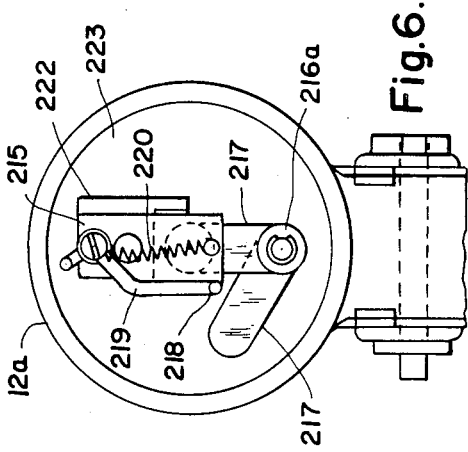
FIG. 6 is an end view as viewed from the right of FIG. 5 with the cover 224 removed.
Figure 7:
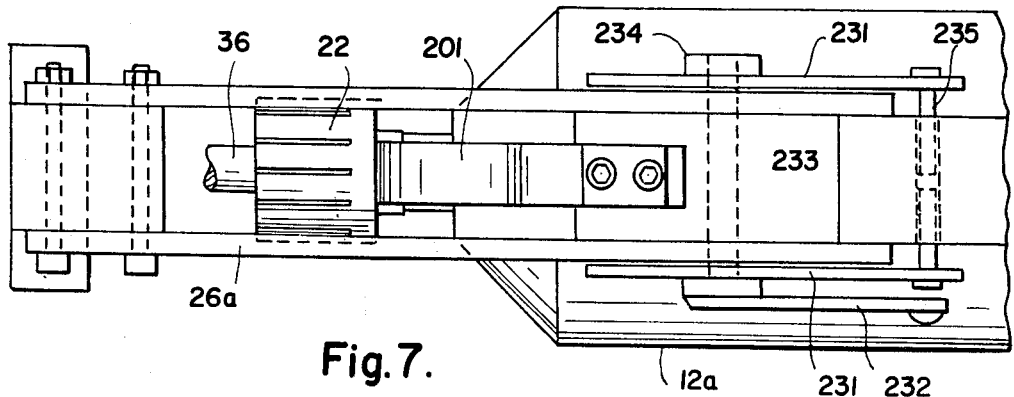
FIG. 7 is a fragmentary, bottom view of the forward portion of the gun shown in FIG. 5; and, FIG. 8 is a schematic diagram of the control circuit for the gun shown in FIGS. 5, 6 and 7.
Figure 8:
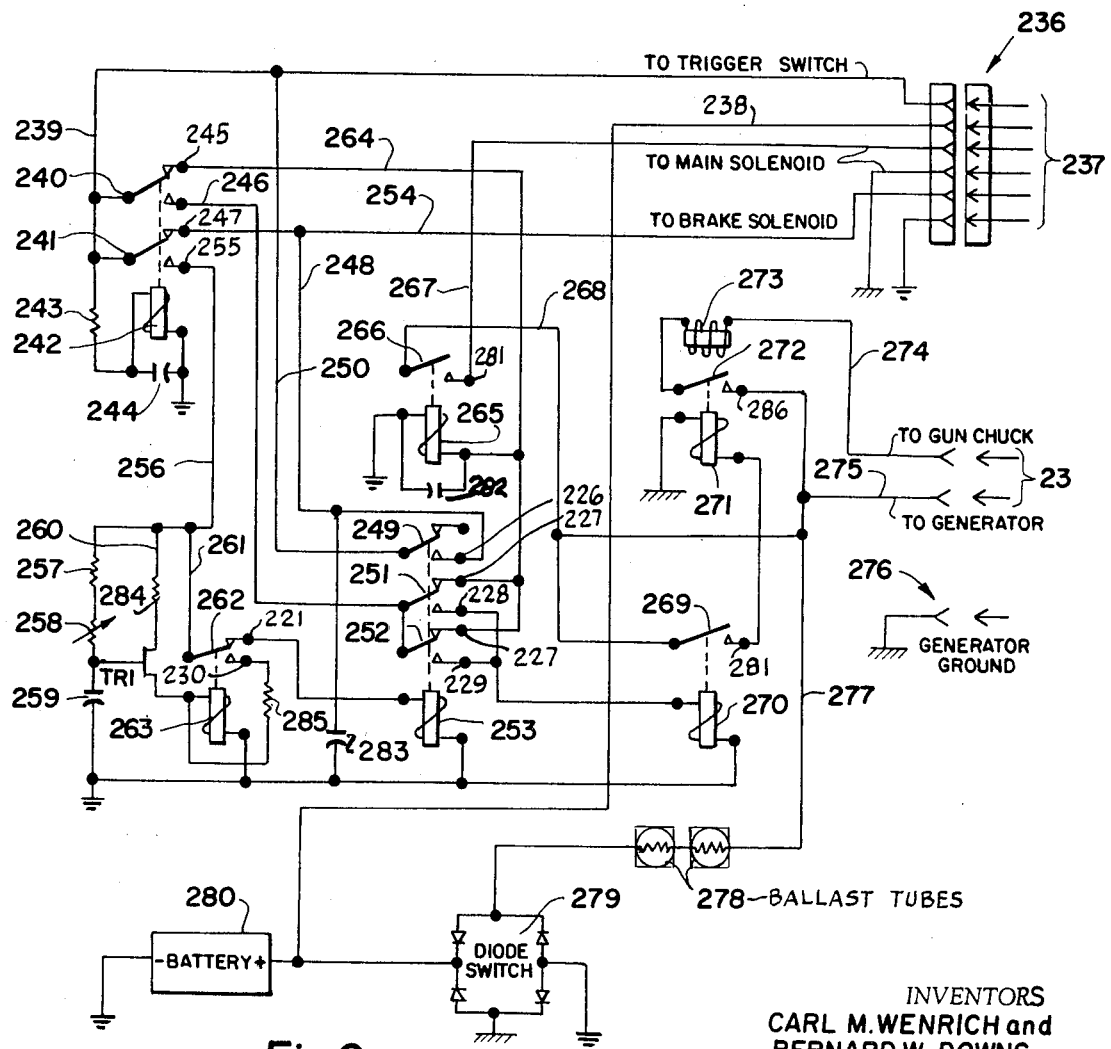

FIGS. 5, 6 and 7 show a modification of the gun, and FIG. 8 shows a modification of the control circuit therefor. The gun, generally denoted by numeral 10a, is equipped with a comfortable pistol grip handle 14a and is the approximate size of a 45 caliber automatic pistol, except that the body 12a of the gun is somewhat larger in size. It has a trigger 16a and trigger guard, located and sized so that an operator's index finger can operate while wearing gloves.

The body and handle of the gun are of a durable light material. The back end of the gun body contains an adjustment 217 and 215 which sets the lift of the stud from the work. The front end of the gun is roughly conical in shape to allow easier viewing of the stud and work area while setting up and welding. The main shaft 202 of the gun will accept a variety of friction chucks 22. These friction chucks are so sized as to accept the various bars or studs 36 to be welded. Guides 231, located in the gun body, accept the support rods 26a. These rods hold the foot 38 which positions the ferrule 34. The guides when tightened will prevent movement of the support rods 26a. The support rods 26a are so constructed, that by sliding in or out of the gun body, the proper plunge adjustment can be made, with relation to the length of the stud.

The ferrule 34 is a ceramic cup, a commercial item, used to provide a bearing for the movement of the stud and a mold which forms the molten metal into a uniform fillet around the stud 36, when it is plunged into the pool of metal.

The socket in the foot which holds the ceramic is so formed that when the stud is welded to the work, the gun may be removed from the stud by lifting the gun away from the work surface and moving the foot to the side, since a slot is provided in the foot which is slightly larger than the diameter of the stud body. The distance of the foot from the front end of the gun is determined by the length of the stud or bar to be welded. The adjustment of this foot is accomplished by sliding the support rods through the guides on the gun body. When the proper adjustment has been determined, the rods are locked by means of the clamping lever 232. The friction chuck 22 makes contact with a braided copper member 201, the other end of which attaches to a connecting block on the bottom of the gun body. The weld current cable 23 is bolted on to this block or, attaches in such a manner so as to be securely fastened to said block. This feature allows the weld current to be conducted to the chuck 22 and thence to the stud 36, by the flexible copper member 201. This eliminates torque and friction on the main shaft of the gun, which would normally result from the weight of the cable, thereby eliminating variations in striking force and weld cycle timing. It also eliminates one source of wear on the gun parts.

The main shaft 202 of the gun has a friction chuck 22 on its front end, and a magnetic plunger 207 on the back end. The plunger operates inside of a solenoid 206. The plunger 207 and main shaft assembly are held to the rear of the gun body by a mainspring 203. The rearward motion of the plunger and main shaft assembly is limited by the stud lift adjustment 217 and 215. The forward motion of the plunger and main shaft assembly is limited by the end of the solenoid case. Therefore, only two adjustments are necessary.

The plunge adjustment is on the support rods 26a. The stud lift is adjusted by the stud lift adjustment 217 and 215 at the rear end of the gun. The terminal connection 236 for the control cable 237 and trigger switch are in the pistol grip handle 14a. The rear extension 209 of the main shaft and plunger assembly contains friction surfaces on which friction pads or brake shoes 225 are allowed to bear. The friction pads 225 are pressed against the friction surfaces by spring pressure from springs 213. The friction pads are supported by a magnetic shaft 211 which forms a small magnetic plunger. This plunger rides inside of a small solenoid 212. When the solenoid 212 is energized, the main shaft plunger 207 is free to move without constraint. When the brake solenoid 212 is de-energized, the main shaft 202 and plunger 207 have a pre-determined amount of constraint to their movement. This constraint is adjustable at the factory, by the proper choice of spring tension. The adjustments are made by adjusting screws 214.

There is an adjustable bubble level sight 42 mounted on the gun, for aiming the gun toward the work at a preset angle, determined by protractor 40 whereby any variation from that angle can be detected and displayed. A stud is inserted in the chuck. The rear cap 224 of the gun is removed, and the proper number of shims 217 are placed into position. The number of shims is determined by the stud size. This adjusts the stud lift. The support rods 26a are unclamped and the foot 38 is so positioned that a straight edge across the bottom of the foot will touch the tip of the stud. The support rods 26a are then clamped by means of the clamping lever 232 and the gun is now adjusted for the selected stud.

With the stud 36 inserted in the chuck and a ferrule 34 inserted in the socket of the foot 38, the gun is positioned so as to place the stud directly at the point where it is to be welded. When the trigger 16a is actuated, the solenoid 206 draws the plunger 207 toward the work, causing the stud 36 to strike the work 35 sharply, so as to break any existing oxide or foreign matter 37 from the surface of the work. The solenoid 206 is then de-energized, and the weld current is applied to the stud. When the solenoid 206 was de-energized, the main spring 203 pulled the stud from the work 35, drawing an arc. The stud lift adjustment 215 and 217 stops the rearward travel of the stud at the proper lift distance. After the passage of a pre-set period of time the weld current is removed from the stud, and simultaneously, the solenoid 206 is energized, causing the stud to move into the pool of molten metal. The ferrule is so formed, as to produce an optimum bead, as in a fillet around the welded stud. If the stud were allowed to move into the pool freely, it would be possible to force molten metal beyond the ferrule, creating a condition known as spatter. To prevent this condition, the brake solenoid 212 is de-energized, when the main solenoid 206 is energized during the plunge cycle. This allows the stud to enter the pool of molten metal smoothly. The molten metal solidifies almost instantaneously and the weld is now completed.

At this time, the gun is lifted away from the work, disengaging the stud from the chuck, and disengaging the foot 38 from the ferrule. The slot in the foot allows the gun to be removed from the welded stud and to be reloaded for the next weld.

This stud welding gun can also be used with a permanent ceramic foot. This ceramic foot is designed in two parts, and provide for a controlled fillet around the stud as part of the weld. The ceramic foot also serves to constrain the spatter and minimize oxidation by reducing the exposure of the weld area to the surrounding atmosphere. The foot also concentrates the heat of the arc within the desired area and reduces the intensity of the arc so that the operator does not require a welding shield between his eyes and the part being welded.

The ceramic foot is in lieu of the commercial ferrule presently being used, as an expendable item with each weld. The two parts would be replaceable, as needed.

This foot eliminates the necessity for expending a ferrule for each weld. This foot eliminates the handling time involved with the placing of individual ferrules and saves the cost of same.

The stud welder controls illustrated by circuits in FIGS. 4 and 8 have two functions. The primary function is to control the weld cycle time, which is that time that the weld current is supplied to the stud. The weld cycle time is a function of the size of the stud and the current delivered by the power source usually a commercially available motor generator. It must, therefore, be adjustable and reproducible. It should also be calibrated into units of time with which the operator is familiar. The other function of the controls illustrated by circuits in FIGS. 4 and 8 is a programming function. The sequence of events and the timing of all operations, (except weld cycle time), is the same for all sizes and types of studs. Therefore, fixed timing circuits can be built into the controller when it is manufactured. In FIG. 4, thermistors 82, 104 and 116 are used to control the time delays required for proper operation of the gun. In FIG. 8, resistor 243 and capacitor 244 provide one time delay on closing of relay 242, and capacitor 282 delays the opening time of relay 265. This eliminates all adjustments except the weld cycle time.

When the trigger switch 16a is actuated, battery 280 is connected through wire 238 and 239 to arms 240 and 241 of relay 242, and to resistor 243. Arm 240 is connected to contact 245 and therefore relay 265 is energized, closing arm 266 and normally open contact 281, which connects through 277 to main solenoid 206 in FIG. 5, energizing main solenoid, which causes plunger 207 to force main shaft 202 in a forward direction, compressing spring 203. Friction chuck 22 and stud 36 are thereby moved toward the work 35.

Arm 241 of relay 242 is connected to normally closed contact 247 which is connected to brake solenoid 212 in the gun (FIG. 5). When brake solenoid is energized, the plunger and main shaft assembly can move freely. Resistor 243 and capacitor 244 across the coil of relay 242 comprise a time delay circuit. Voltage across capacitor 244 rises at a rate determined by resistor 243 and capacitor 244. At some pre-determined time, the voltage across capacitor 244 is high enough to close relay 242. When relay 242 closes, arm 240 is connected to contact 246 and arm 241 is connected to contact 255. When arm 240 is removed from contact 245, relay 265 is de-energized, but capacitor 282 holds the relay closed long enough for arm 240 to transfer to contact 246, which is connected to arm 251 on relay 253. Arm 251 connects to contact 227, which is the coil of 265, thereby keeping the main solenoid energized during the transfer time of the relay 242. When relay 242 closed, arm 241 transferred from contact 247 to contact 255, de-energizing the brake solenoid.

Contact 255 connects to arm 262 of relay 263 and normally closed contact 221 of relay 263. 221 connects to relay 253 energizing relay 253. 255 also applies positive battery voltage to resistor 284 and 257. At this time, capacitor 259 starts to charge through rheostat 258.

Thus, when the trigger switch 16a is actuated, main solenoid 206 is energized, and brake solenoid 212 is energized, causing the stud to be rapidly driven to the work, thereby breaking through oxide or other foreign material, 37. After a time, determined by resistor 243 and capacitor 244, relay 242 closes, which starts weld-cycle timer TR-1. Also when relay 242 closes and contact 255 applies battery current to relay 253, relay 253 closes, de-energizing relay 265, thereby de-energizing main solenoid 206. Also, when relay 242 closed, 241, transferred from 247 to 255, de-energizing brake solenoid 212. Capacitor 283 across the brake solenoid keeps brake solenoid energized long enough so that arm 249 of relay 253 can transfer to contact 226, re-applying battery voltage to the brake solenoid. When relay 253 closes, arms 251 and 252 connect to contacts 228 and 229, closing relay 270. Arm 269 and contact 281 apply welding generator voltage to coil of relay 271, closing contacts 272 and 286. Welding current from generator through 275, 286, 272 through arc-blow coil 273, and 274 is conducted to the gun chuck 22 and stud 36, applying welding current to stud 36, which at this time is still against work piece 35. When relay 253 was energized, and arms 251 and 252 transferred from contacts 227, relay 265 was de-energized, but capacitor 282 kept main solenoid energized long enough to close relays 270 and 271, applying weld current to stud. Capacitor 282 discharges into coil 265 and in a short time releases relay 265, de-energizing main solenoid 206. Spring 203 then forces main shaft 202 and plunger 207 back against the stud lift adjustments 215 and 217.

Because welding current is at this time applied to the stud, an arc is drawn and the end of the stud and the area under the stud, i.e., work piece 35 is now melting.

As previously described, capacitor 259 has been charging through rheostat 258. At a time determined by the value of 258, voltage across 259 is high enough to cause TR-1 to conduct, closing relay 263. Arm 262 transfers from 221 to 230, holding relay 263 closed for as long as trigger switch 16A is depressed.

When 262 transferred from 221, relay 253 was de-energized, and arms 251 and 252 transfer from contacts 228 and 229 to contact 227, de-energizing relay 270 and 271, removing welding current from the stud 36. While contacts 286 and 272 are opening at these high currents, a destructive arc is formed between the contacts. The current causing this arc must pass through arc-blow coil 273, which is producing a magnetic field perpendicular to the arc path. This magnetic field causes the arc to be stretched in a curved path until its resistance is so high that the arc is eliminated.

When relay 253 was de-energized and arms 251 and 252 transferred to 227, relay 265 was again energized, closing contacts 266 and 281, energizing main solenoid and moving stud 36 into the molten pool of metal.

When relay 253 opened, arm 249 transferred from contact 226, de-energizing the brake solenoid, allowing friction shoes 225 to blow the advance of the stud into the molten pool so as to eliminate the spatter and to facilitate the formation of a proper fillet around the stud.

At this time, the weld is complete. When the trigger switch 16A is now released, all of the time delay circuits are reset to their starting condition and the gun is ready to produce another weld.

When the trigger is released, all elements of the circuit are returned to their original condition and the controller (FIG. 8) is ready to produce the next weld. The main solenoid 206 and the main contactor relay 271 receive their actuating current from the welding power source, TR1 and associated circuitry, as well as the solenoid and contactor control relays 253, 265 and 270, receive their power from an internal rechargeable storage battery 280, which can be the conventional lead-acid battery, or any secondary battery capable of being recharged after use. There is built into the controller (FIG. 8) ballast tubes 278 (FIG. 4) ballast 148, transistor 158, and Zener diode 151, a regulated battery charging circuit, which also receives its power from the welding power source. This arrangement has two advantages, — namely, 1. there is available a well regulated voltage for the timing circuit (FIG. 4 and FIG. 8) which contributes to accurate timing and
2. no other power source is required other than the welding power source.

With the control (FIG. 8) connected to welding power source, current flows from the power source or generator through current regulators 278 to the diode switch 279 which is the combination of diodes. The purpose of the diode switch is to present the proper polarity to the battery 280, no matter what connection is used at the power source or generator. The current regulators have a resistance which is dependent upon the current into the battery, for a power source voltage variation from 25 to 100 volts. The battery charges up to 12 volts, approximately, and thereafter remains at that voltage.

ADVANTAGES OF STUD GUN AND CONTROLS

The following is a summary of the advantages of the stud gun:

The ceramic ferrule built into the foot eliminates the necessity for expending one part with each weld. The shim lift adjustment requires no tools for setting up the stud lift. The shim lift adjustment allows accurate, reproducible adjustment for any and all stud sizes without the necessity for measurement or computation,— also it has no loose parts to be misplaced.

With the hollow plunger, silicone oil plunge adjustment, the rate of plunge is easily adjusted for optimum operation. Variations of rate of plunge with temperature are minimized. The rate of plunge adjustment can be made by the operator if necessary. With the magnetic brake rate of plunge adjustment the constraint can be applied at the precise time required and can be adjusted to the precise value required.

Because the weld cycle starts with the stud in the retracted position, all ferrules can be used, even though with flux attached to them.

The gun allows more dependable welding because the weld cycle starts by first center punching to break through any surface contamination and then drawing an arc from the clean metal uncovered by the center punching operation.

Because there is no pre-loading of a spring required by the efforts of an operator, as is necessary with other guns, operator fatigue is reduced.

Because the gun has fewer parts, it is lighter, therefore, further reduces operator fatigue.

The gun has much fewer parts, will be easier and less costly to manufacture, and will require less maintenance.

Where pre-loading of a spring is required as in the case of other guns, it is more difficult to place the stud at the proper angle, since the gun tends to rotate around the point of the stud. In the present gun, the stud is retracted, and the flat surface of the ferrule is all that contacts the work. It is, therefore, easier to accurately place the stud, both in position and angular alignment.

No tools or fixtures or instruments are necessary to accurately adjust the gun for any stud, since the stud itself is the measuring stick to which the gun is adjusted, and the adjustments are made by a built-in lever and feeler gauge assembly.

The lift adjustment, which determines the length of the arc, is very important, as it, in concert with the value of the weld current and weld cycle time, determines the heat input to the weld, and thus determines to a large extent the quality of the weld. In present guns, this adjustment is made in a manner that precludes accurate reproduction of conditions even if the lift at this time is correct. In other words, you can set it accurately, but will have as much trouble resetting it as you had when you set it up in the first instance.

With the present gun, the lift adjustment is accomplished by the insertion or removal of hinged spacers, or shims. The adjustments are in precise increments and the increments relate directly to the incremental variations of the stud sizes. Therefore, no measurements or tables are required. All that need to be done is to count the shims. The shims are a part of the gun, can not be removed or misplaced, they are identical, so need not be marked.

The plunge adjustment is that adjustment which determines the distance that the stud is inserted into the molten pool of metal after the arc has been turned off. In this gun, the foot is so made that the amount of ferrule that will project from the bottom of the foot after the ferrule is seated in the foot will be equal to the plunge required.

The following is a summary of the stud gun controls:

The constant voltage timing circuit supply allows more precise control of the weld-cycle time so as to allow more reproducible results. The battery supply eliminates the requirement for AC power to the control circuits. The same control can be used in the shop and in the field. The all electronic timing circuits are lighter in weight, less subject to change in characteristics, and are easier to compensate for ambient condition variations. The diode switch allows proper connection of the generator without regard to polarity. The regulator allows wide variations in generator characteristics. The transistor timing circuits allow precise timing under widely different temperature extremes.

Thus it will be seen that we have provided a highly efficient stud welding gun and control circuit having the aforesaid enumerated advantages which constitute a very substantial improvement over known stud welding guns and circuits.

Also we have provided a novel method of striking an arc by a stud welding gun even through an oxide coating or contaminated surface.

While we have illustrated and described several embodiments of our invention, it will be understood that these are by way of illustration only, and that various changes and modifications may be made within the contemplation of our invention and within the scope of the following claims.

We claim:

1. The method of operating a stud welding gun having a reciprocable stud-supporting chuck mounted on an actuating shaft, comprising forcefully accelerating said shaft axially forwardly through space by the application of electromagnetic means to develop sufficient mementum and hammer-like action to strike the work and penetrate any surface coating thereon and to make metallic contact with the work before applying welding current through said chuck and stud, and after a very short time period following striking, applying full welding current through said chuck and stud while retracting the stud from the work to draw an arc a predetermined distance so as to produce heat sufficiently to melt the stud and parent metal, and thereafter interrupting the welding current and moving the stud into the molten metal to form a "soft plunge" and create a weld between the stud and work.

2. The method recited in claim 1 wherein no current is passed through said stud during such initial penetration of the coating.

3. The method recited in claim 1 wherein said stud is yieldably retracted from the work by applying spring means to draw said arc.

* * * * *